(12) United States Patent
Humphrey et al.

(10) Patent No.: US 9,229,514 B2
(45) Date of Patent: Jan. 5, 2016

(54) MANAGING ELECTRIC ENERGY DISTRIBUTION TO MULTIPLE LOADS USING SELECTIVE CAPPING

(75) Inventors: Daniel Humphrey, Houston, TX (US); Mohamed Amin Bemat, Cypress, TX (US)

(73) Assignee: Hewlett Parkard Enterprise Development LP, Houston, TX (US)

( * ) Notice: Subject to any disclaimer, the term of this patent is extended or adjusted under 35 U.S.C. 154(b) by 542 days.

(21) Appl. No.: 13/386,375

(22) PCT Filed: Jan. 29, 2010

(86) PCT No.: PCT/US2010/022473
§ 371 (c)(1),
(2), (4) Date: Jan. 20, 2012

(87) PCT Pub. No.: WO2011/093862
PCT Pub. Date: Aug. 4, 2011

(65) Prior Publication Data
US 2012/0283892 A1 Nov. 8, 2012

(51) Int. Cl.
*G05D 3/12* (2006.01)
*G06F 1/28* (2006.01)

(52) U.S. Cl.
CPC ........................................ *G06F 1/28* (2013.01)

(58) Field of Classification Search
CPC . G06F 1/3203; G06F 1/3206; G06Q 10/0631; H02J 2003/146; Y02B 60/142
USPC ..................... 700/17, 19, 286, 291, 295, 300; 713/300, 310, 320
See application file for complete search history.

(56) References Cited

U.S. PATENT DOCUMENTS

| 5,051,861 | A  | * | 9/1991  | Purkayastha | .......... | H01H 73/14 |
|           |    |   |         |            |            | 340/639 |
| 5,495,406 | A  | * | 2/1996  | Kushiro et al. | ................. | 700/22 |
| 5,754,445 | A  | * | 5/1998  | Jouper et al. | .................. | 700/295 |
| 6,330,516 | B1 | * | 12/2001 | Kammeter | .......... | G01R 19/2513 |
|           |    |   |         |            |            | 702/122 |
| 7,453,267 | B2 | * | 11/2008 | Westbrock, Jr. | ...... | H02H 1/0038 |
|           |    |   |         |            |            | 324/142 |
| 7,657,763 | B2 | * | 2/2010  | Nelson et al. | ................. | 713/300 |
| 7,865,272 | B2 | * | 1/2011  | Spitaels et al. | ................ | 700/299 |
| 8,018,348 | B1 | * | 9/2011  | Pagnani | ............... | G01R 31/041 |
|           |    |   |         |            |            | 340/635 |
| 8,229,602 | B2 | * | 7/2012  | Montgomery et al. | ........ | 700/295 |
| 8,324,755 | B2 | * | 12/2012 | Stair | ......................... | H02J 3/14 |
|           |    |   |         |            |            | 307/23 |
| 8,719,123 | B2 | * | 5/2014  | Rohrbaugh | ............ | G06Q 10/06 |
|           |    |   |         |            |            | 324/110 |

(Continued)

FOREIGN PATENT DOCUMENTS

| CN | 101277200 | 10/2008 |
| CN | 101354606 | 1/2009  |

*Primary Examiner* — Darrin Dunn
(74) *Attorney, Agent, or Firm* — Hewlett Packard Enterprise Patent Department

(57) ABSTRACT

An electric energy distribution system may include plural loads configured to receive electric energy from a common feed or branch. Each of the loads may be configured to operate in at least first and second modes such that it may consume current, VA or power up to a first cap when running in its first mode and up to a second cap when running in its second mode. The first cap may be higher than the second cap. A sensor component may monitor a parameter that corresponds to an aggregate amount of electric energy being consumed by all of the plural loads from the common feed or branch. A manager component may be configured, when the parameter meets or exceeds the threshold, to select one of the loads currently running in its first mode and to cause the selected load to run in its second mode.

15 Claims, 7 Drawing Sheets

(56) References Cited

U.S. PATENT DOCUMENTS

| | | | |
|---|---|---|---|
| 8,850,240 B2 * | 9/2014 | Allen-Ware | G06F 1/26 713/300 |
| 2003/0196126 A1 | 10/2003 | Fung | |
| 2004/0078153 A1 | 4/2004 | Bartone et al. | |
| 2007/0245161 A1 * | 10/2007 | Shaw et al. | 713/300 |
| 2007/0300085 A1 * | 12/2007 | Goodrum et al. | 713/300 |
| 2008/0172312 A1 | 7/2008 | Synesiou et al. | |
| 2008/0178019 A1 * | 7/2008 | McGrane et al. | 713/320 |
| 2008/0184230 A1 * | 7/2008 | Leech et al. | 718/100 |
| 2008/0221737 A1 * | 9/2008 | Josephson et al. | 700/276 |
| 2008/0222435 A1 * | 9/2008 | Bolan et al. | 713/310 |
| 2008/0313492 A1 * | 12/2008 | Hansen | 714/5 |
| 2009/0125737 A1 * | 5/2009 | Brey et al. | 713/322 |
| 2009/0187783 A1 * | 7/2009 | Hansen | 713/340 |
| 2009/0276651 A1 * | 11/2009 | Conroy et al. | 713/340 |
| 2010/0010683 A1 * | 1/2010 | Kates | 700/293 |
| 2010/0037077 A1 * | 2/2010 | Kashyap | 713/330 |
| 2010/0070787 A1 * | 3/2010 | Bieswanger et al. | 713/322 |
| 2010/0174419 A1 * | 7/2010 | Brumfield et al. | 700/295 |
| 2010/0207604 A1 * | 8/2010 | Bitsch | G01R 21/133 324/140 R |
| 2010/0256934 A1 * | 10/2010 | Rohrbaugh | G01R 31/3278 702/62 |
| 2010/0332872 A1 * | 12/2010 | Hanson et al. | 713/320 |
| 2011/0144818 A1 * | 6/2011 | Li et al. | 700/291 |

\* cited by examiner

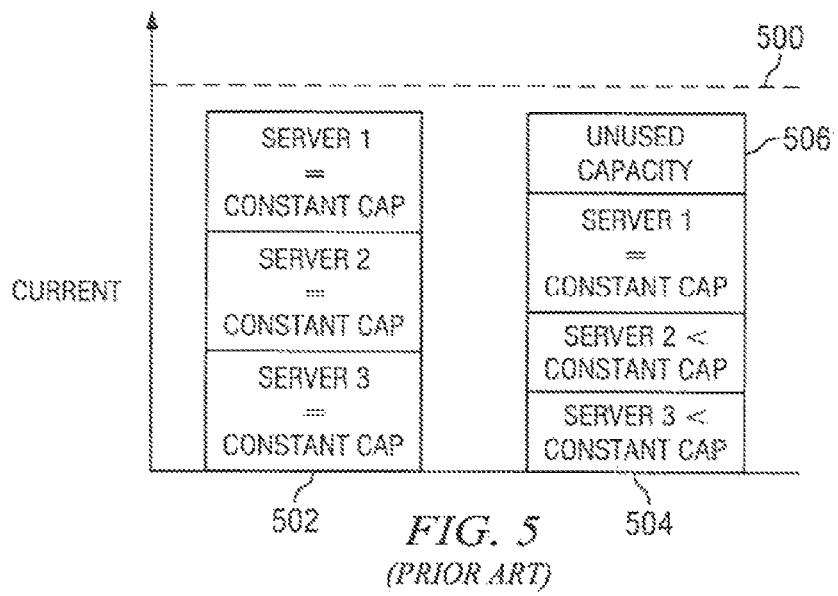
FIG. 5
*(PRIOR ART)*
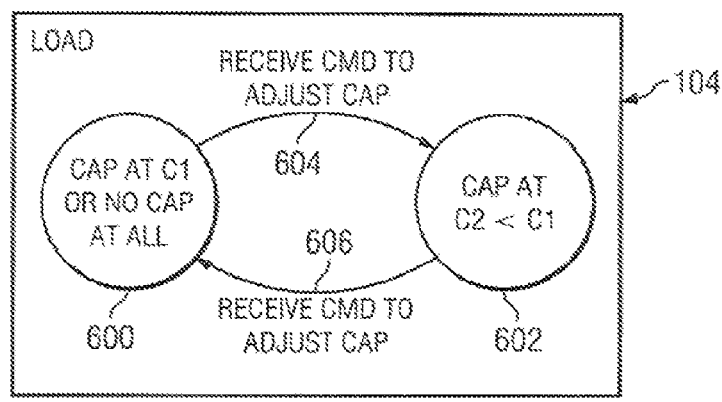
FIG. 6
FIG. 7

MANAGING ELECTRIC ENERGY DISTRIBUTION TO MULTIPLE LOADS USING SELECTIVE CAPPING

CROSS-REFERENCE TO RELATED APPLICATION

This application is a national stage application under 35 U.S.C. §371 of PCT/US2010/22473, filed Jan. 29, 2010.

BACKGROUND

It is common in a typical data center to house multiple server computers inside a rack. The rack will normally receive at least one feed from an electric utility and will distribute power from the feed to the servers housed inside. A power distribution unit ("PDU") in the rack includes a circuit breaker for limiting the amount of current being drawn by the servers from the feed. If the circuit breaker should trip, all of the servers dependent on the feed will suffer a power loss.

BRIEF DESCRIPTION OF THE DRAWINGS

FIG. 5 is a block diagram illustrating a current capping scheme according to the prior art.

FIG. 6 is a state diagram illustrating example behavior of a load according to embodiments of the invention.

FIG. 7 is a block diagram illustrating example internal state of a manager component according to embodiments of the invention.

DETAILED DESCRIPTION

FIGS. 1-4 illustrate a variety of classes of implementations of electric energy distribution systems according to embodiments of the invention. The embodiments are shown by way of example and not by way of limitation. Persons having ordinary skill in the art and having reference to the examples given herein will be able to apply the teachings of the examples to other configurations and in other contexts.

Figure 1:
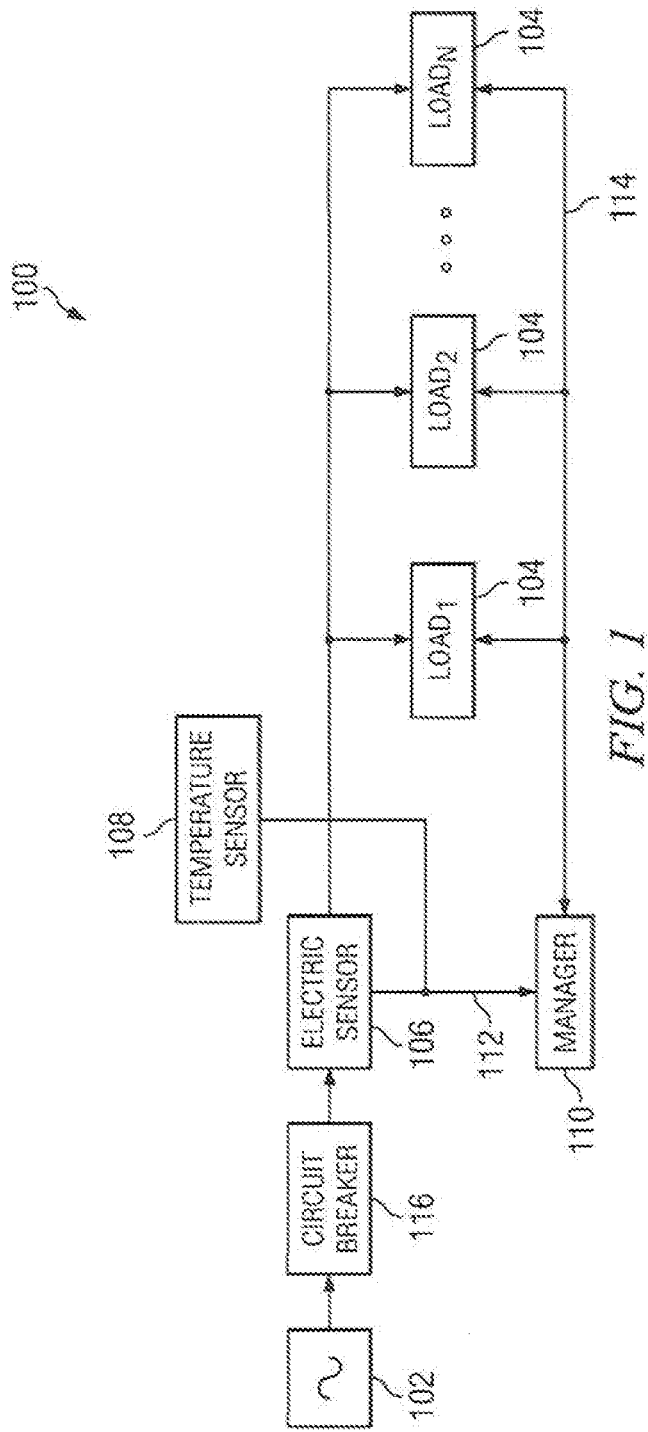
FIGS. 1-4 are schematic diagrams generically illustrating, by way of example, a variety of electric energy distribution systems according to embodiments of the invention.

Refer first to the generic example of FIG. 1. In an electric energy distribution system 100, plural loads 104 are configured to receive electric energy from a common feed 102. Loads 104 may include any type and combination of electrical loads. In some embodiments, the loads may be computing devices such as server computers. A sensor component 106 and/or 108 is configured to monitor a parameter that corresponds to an aggregate amount of electric energy being consumed by loads 104 from feed 102. For example, the parameter may correspond to one or more electrical values as in the case of electric sensor 106, or to a temperature as in the case of temperature sensor 108. A system 100 need not have both types of sensors. A manager component 110 is coupled to sensor component 106 and/or 108 via a sensor bus 112 and is configured to determine whether the parameter meets or exceeds a threshold. If the parameter meets or exceeds the threshold, manager component 110 may change the state of loads 104 by signaling over a management bus 114. A circuit breaker 116 may also be provided on common feed 102.

Sensor component 106 may be designed to sense current or voltage or both. In the latter case, the sensed values may be utilized to determine a volt-ampere product ("VA") or may be utilized to determine a level of power. Persons having skill in the art will appreciate that VA and power are not always identically the same due to characteristics of some loads that may lead to a non-unity power factor. Any conventional technique may be used to measure the parameter of interest. For example, sense resistors, current transformers or Hall-effect devices may be used.

Sensor component 108 may be designed to sense a temperature somewhere on or near loads 104. Any conventional temperature sensing device may be employed. In embodiments that use a temperature sensor 108, it is believed that enhanced accuracy will be obtained by sensing a temperature inside an enclosure 208 that houses all of loads 104. (See FIGS. 2-4.) For example, enclosure 208 may be a rack in a data center for embodiments in which loads 104 are computing devices. Moreover, some embodiments may usefully employ more than one temperature sensor 108. For example, multiple temperature sensors 108 may be positioned in or around enclosure 208 or components therein so as to sense inlet and outlet temperatures related to movement of a fluid cooling medium such as air or liquid.

Manager component 110 may be implemented as a discrete component as shown or its functionality may instead be provided by one of loads 104. Manager 110 may be integrated with or into other components if necessary or convenient to do so.

In some embodiments, manager component 110 and sensor component 106 and/or 108 may be housed within a PDU 206 (again see FIGS. 2-4) and the PDU mounted in a rack. Manager component 110 and sensor components 106, 108 need not be included within PDU 206 in every embodiment, however.

Buses 112, 114 may take any conventional form, including for example digital serial or parallel buses or one or more wires carrying analog signals. Any signaling protocol may be used. Buses 112, 114 may be different buses in some embodiments or the same bus in other embodiments.

Figure 2:
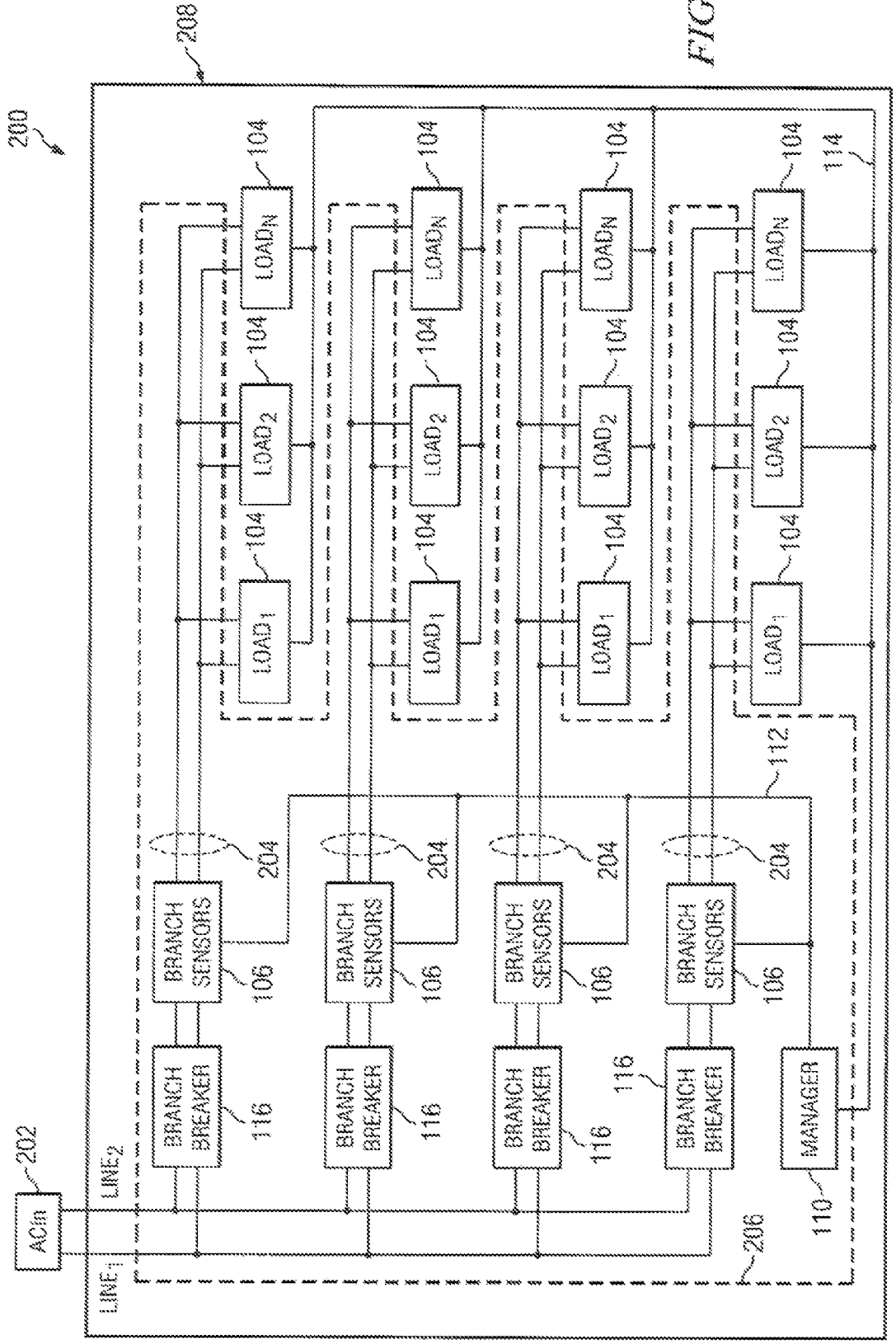
Figure 3:
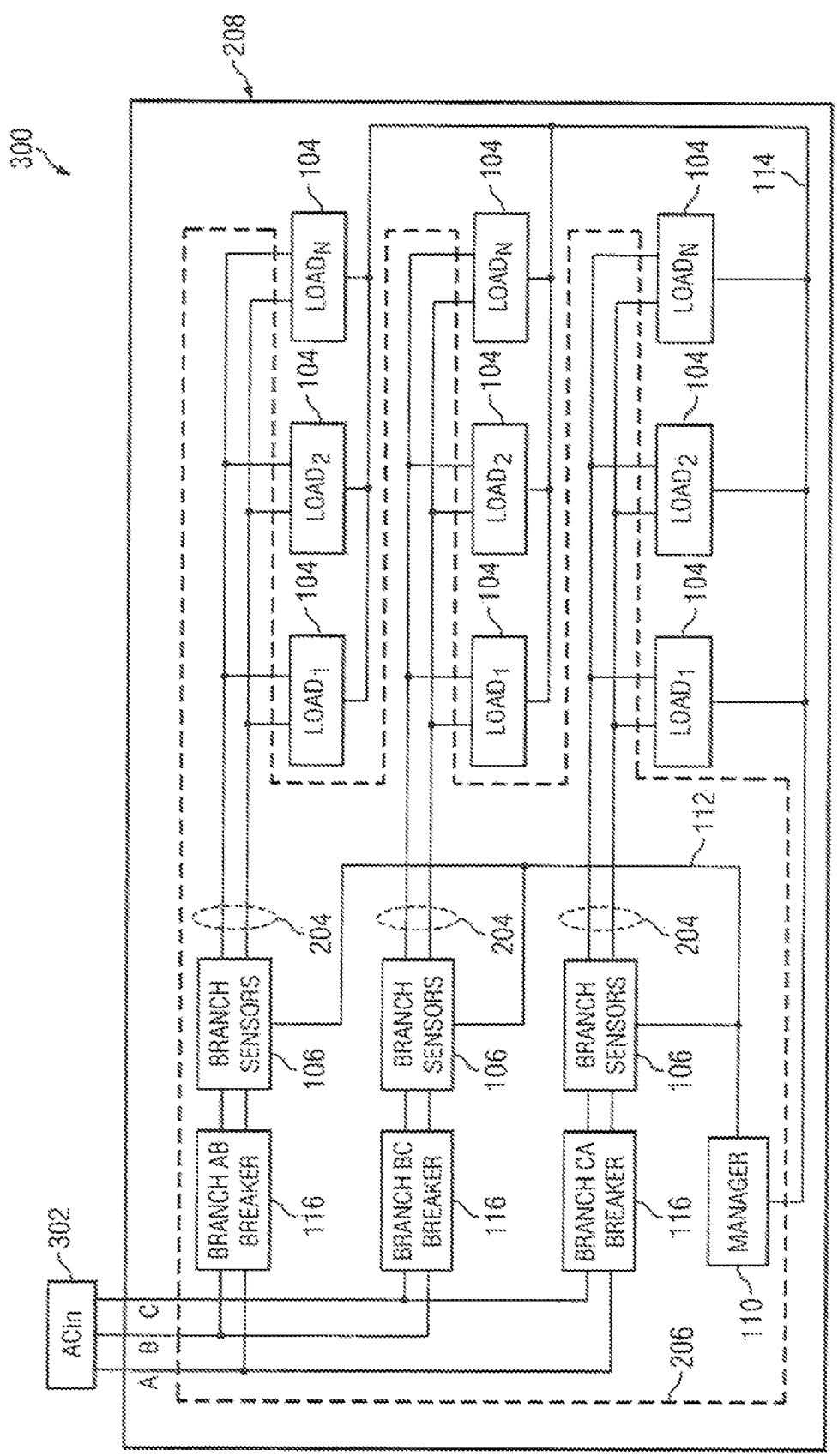
Figure 4:
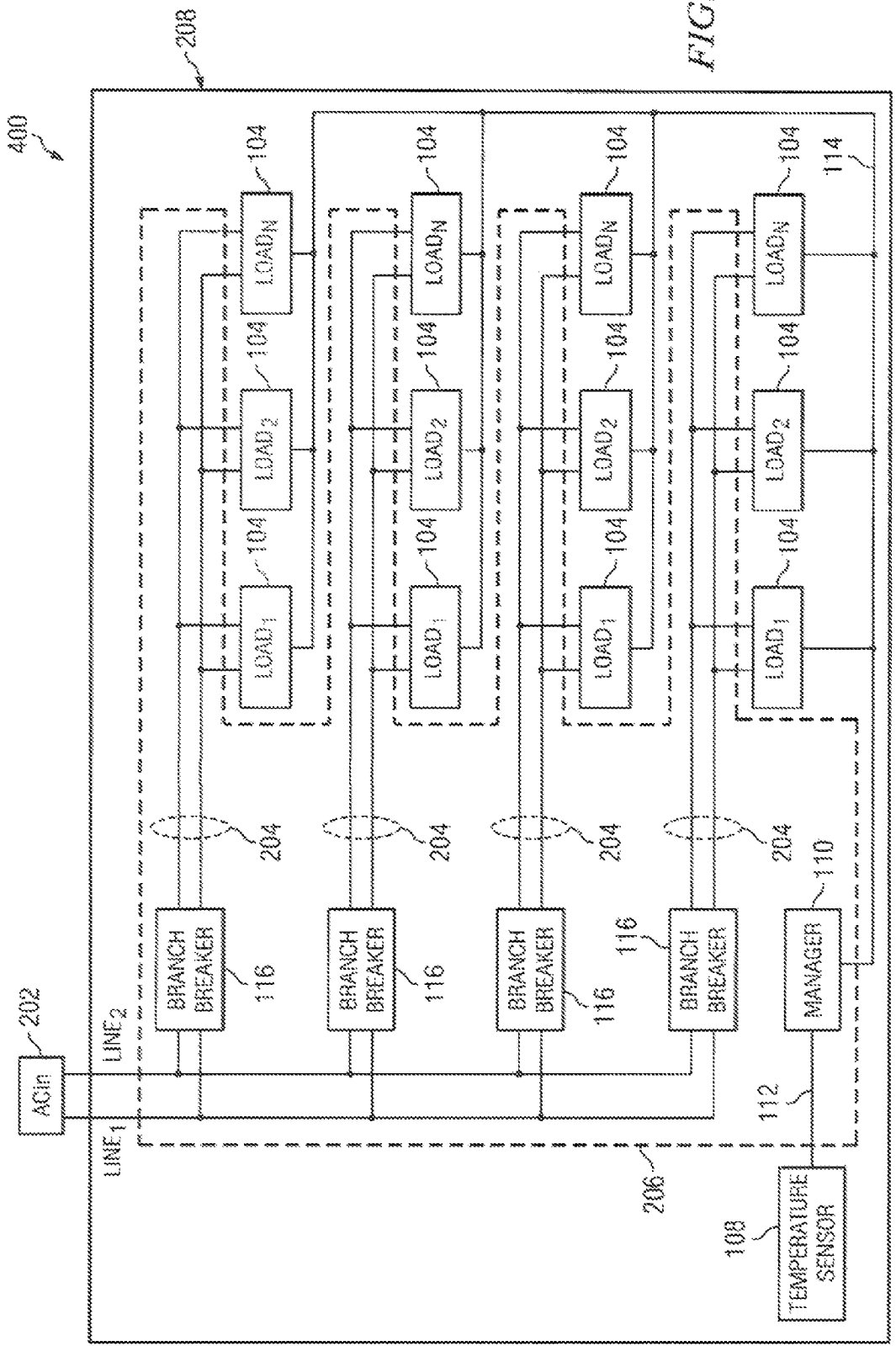

As FIGS. 2-4 illustrate, specific embodiments of the invention can take a wide variety of forms. In general, multiple branches 204 may be taken from the common feed. Multiple loads 104 may be disposed on each branch. Any number of branches can be provided, and any number of loads can be provided per branch. A separate circuit breaker 116 may be provided on each branch 204. In these kinds of embodiments, sensors 106 may be employed on a per-branch basis, as shown. In some embodiments, one or more of circuit breakers 116 may be ganged together so that, should one breaker trip, the rest of the ganged breakers will trip as well.

FIGS. 2 and 3 illustrate that even the type of feed 102 can vary. Feed 202 in system 200 takes the form of a two-line alternating current ("AC") feed. Both lines may be hot or one line may be hot and the other neutral. Feed 302 in system 300 is a three-wire AC feed. In the latter type of embodiments, typically each of wires A, B, C is hot, and they are 120 degrees out of phase with one another. Two-line branches 204 can be taken from any pair of the three wires, as shown. In still other cases, four wires may be present including three hot and one neutral. In those cases, branches may be taken from A to neutral, B to neutral and/or C to neutral. Other combinations and variations are possible.

FIG. 4 illustrates that, in some embodiments, temperature sensor 108 may be employed in lieu of electric sensors 106. System 400 could just as easily use any of the feed type variations described in relation to the other example embodiments.

It is known in the prior art for a server computer having its own power supply to be able to self-limit its current draw roughly at or below a constant cap. Specifically, a prior art server computer can be manually configured with a current cap value. In operation, such a server computer will invoke a current-reduction mode when a current value being sensed at its own power supply reaches a threshold value. In the current-reduction mode, typically the central processing unit ("CPU") or other components within the server computer are idled according to a predetermined duty cycle. Thus the server computer can continue to do useful work during portions of the duty cycle in which the CPU is not idled, but over time will draw less current than when not in the current-reduction mode. Although the current cap value for a prior art server computer is manually reconfigurable, the current cap is constant during operation absent manual intervention.

One problem with the constant cap feature of prior art server computers is illustrated in FIG. 5. Assume that the three servers of FIG. 5 all draw current through a common circuit breaker having a trip level indicated by threshold 500. In order to ensure that the breaker is never tripped, the constant cap level for each server must be chosen so that the sum of the three do not exceed threshold 500, as illustrated at column 502. But in ordinary operation, it may be common for two of the servers (say servers 2 and 3) to require less than their constant cap, and for one of them (say server 1) to desire more than its constant cap will allow. In this event, server 1 is constrained to operate at a maximum current draw dictated by its constant cap, as illustrated at column 504. The result is wasted capacity 506 that could have been employed usefully by server 1. Embodiments according to the invention help to alleviate this problem.

As FIG. 6 illustrates, a load 104 according to embodiments of the invention may be designed to operate in at least two modes 600, 602, each corresponding to a different cap level. Moreover, load 104 may be designed to adjust its cap level dynamically during operation in response to a command from manager component 110 received over management bus 114, as shown at 604 and 606. In one type of embodiment, management component 110 may communicate a desired cap level to load 104 in each of cases 604, 606. In another type of embodiment, load 104 may associate each of modes 600, 602 with a predetermined cap level internally, and management component 110 may simply select a mode in cases 604, 606. The mechanism for causing load 104 to comply with a given cap level, once the cap level or corresponding mode has been indicated, may be according to any conventional technique including the one described in the immediately preceding paragraph.

By way of example, mode 600 may correspond to cap level C1, and mode 602 may correspond to cap level C2. Cap level C2 is lower than cap level C1. Thus the maximum current a load 104 may consume when operating at cap=C2 will be less than that of a load operating at cap=C1. Cap level C1 may also correspond to a mode in which no current-reduction technique is employed at all, or equivalently to a mode in which the duty cycle of any current-reduction mechanism employed in the load is set to 100%.

FIG. 7 illustrates example internal state of management component 110. In general, manager 110 may keep a set of information relating to each of loads 104. Specifically, it may keep values that define C1 and C2 for each load, such as values A and B for load L1 as shown in columns 706, 708. Value A might correspond to a first current level or duty cycle or mode, and value B might correspond to a second current level or duty cycle or mode. The values of C1 may be different for each load or they may be the same. Likewise, the values of C2 may be different for each load or they may be the same. For implementations that include multiple branches as do systems 200, 300, 400, manager 110 may associate each load with a branch identifier as shown in the table at column 702. Manager 110 may keep some value in state column 704 to indicate in which mode or at which cap or duty cycle the given load is currently operating. Finally, manager 110 may establish a priority ordering across all loads. 104 on a given branch by associating a priority value 700 with each load. All of the values in the table of FIG. 7 may be configured by an administrator, for example by means of a graphical user interface provided by manager 110 or by one of loads 104 via a network connection. Any conventional data structures or techniques may be used to store the information just described; it need not be stored in a table format per se.

Figure 8:
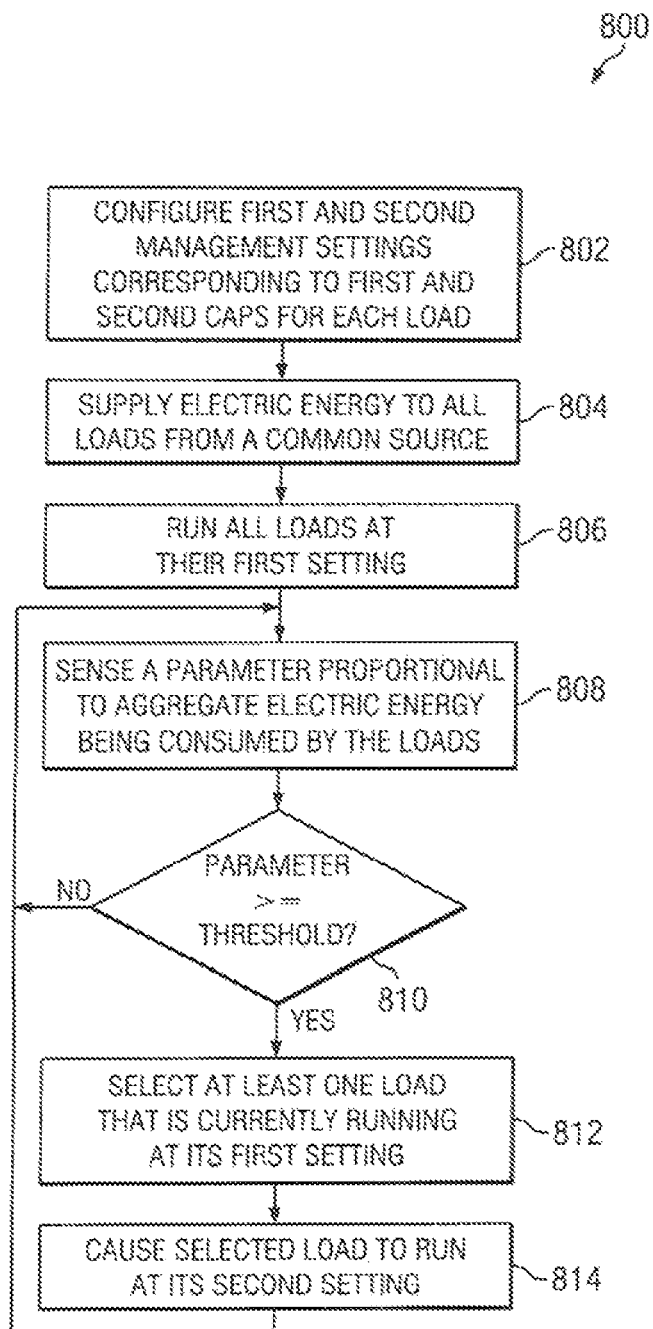
FIG. 8 is a flow diagram illustrating methods for managing an electric energy distribution system according to embodiments of the invention.

Example behavior of management component 110 will now be described below in relation to FIGS. 8-10. Referring to method 800 in FIG. 8, in step 802 an administrator configures first and second management settings 706, 708 corresponding to caps C1 and C2 for each load 104.

Figure 9:
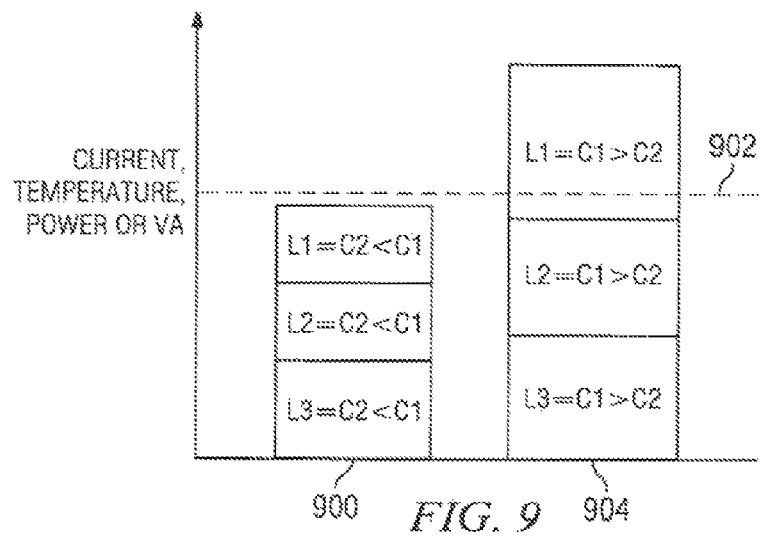
FIG. 9 is a block diagram illustrating an example configuration of management settings according to embodiments of the invention.

One example of step 802 is illustrated in FIG. 9. In column 900, the administrator sets caps C2 such that, if all loads 104 were simultaneously to operate at their respective C2 cap levels, the aggregate electric energy consumed by the loads would not exceed a threshold energy level 902. Threshold energy level 902 might correspond to a trip level of a circuit breaker 116 on the branch, or it may correspond to some other threshold such as a temperature, a power level or a VA level. In column 904, the administrator sets caps C1 such that, if loads 104 were simultaneously to operate at their respective C1 cap levels, the aggregate electric energy consumed by the loads would exceed threshold energy level 902. In implementations that include multiple branches 204, the above settings may be made branch-specific by summing the caps only for loads 104 on the relevant branch and comparing the sums with a threshold 902 that may be specific to that branch.

Referring again to FIG. 8, in step 804 electrical energy is supplied to loads 104 from a common source or feed 102, 202, 302 or branch 204. In step 806, the loads are allowed to run at their respective first management settings C1. In step 808, a parameter corresponding to components 106 and/or 108 is sensed. The value of the parameter is compared, either in the sensor components or in the manager component or elsewhere, with the relevant threshold 902. If it is determined in step 810 that the parameter is below threshold 902, operation resumes at step 808. But if it is determined that the parameter equals or exceeds the threshold, then in step 812 manager 110 selects at least one load 104 that is currently running, at its first management setting C1, and in step 814 causes the selected load 104 to run at its second management setting C2. Operation then resumes at step 808.

In some embodiments, step 812 may be performed such that manager 110 uses priority information 700 and state information 704 to select the lowest priority load 104 that is currently running at its first management setting C1.

Figure 10:
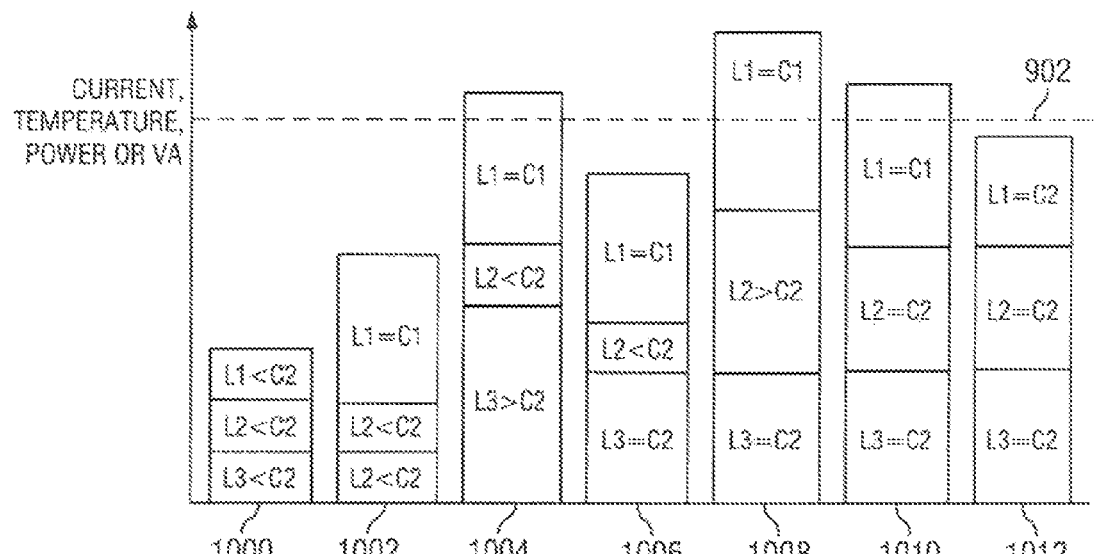
FIG. 10 is a block diagram illustrating loads in varying example states of an electric energy distribution system according to embodiments of the invention.

FIG. 10 illustrates an example of how method 800 may perform in a three-load embodiment under various conditions. In the example, the symbols L1, L2 and L3 represent the actual energy levels being consumed by a given load at the relevant time. The symbols C1, C2 represent the configured cap levels in the table of FIG. 7 for a particular load. Management setting refers to the mode or cap level that is currently in effect for a given load by virtue some communication that has occurred between manager 110 and the given load. Assume that the first load is priority 1, the second load is priority 2 and the third load is priority 3.

In column 1000, each of the three loads is running at its first management setting C1 (as dictated by step 806) but is actually consuming an energy level less than its configured cap level C2. In column 1002, the first load experiences a need to consume more energy. So it is able to increase its consumption level up to its configured cap level C1. In column 1004, the third load also experiences a need to consume more energy. So it increases its consumption level above what would correspond to its configured cap level C2 and begins to approach its configured cap level C1. But when this happens the sensor component and/or manager component detect a breach of threshold 902. So the manager executes steps 812 and 814, this time selecting the third load because of its low priority, and instructing the third load to run at management setting C2. The consequence is that the third load constrains its energy consumption to its lower configured cap C2, as shown at column 1006. All the while, the first load is still able to consume up to its higher configured cap C1 because of its higher priority.

In column 1008, assume now that the second load experiences a need to increase its energy consumption, and that it begins consuming energy at a level higher than its configured cap C2. The result in this case is another threshold violation. So manager 110 again executes steps 812 and 814. This time it selects the second load because the second load is now the lowest priority load currently running at its first management setting C1. Manager 110 instructs the second load to run at its second management setting C2, as shown in column 1010. But in this case the result is still a threshold violation. So manager 110 executes steps 812 and 814 one more time. On this final iteration, it selects the first load because it is now the lowest priority load currently operating at its first management setting C1. It instructs the first load to run at its second management setting C2, as shown in column 1012. All three loads may now operate safely below threshold 902. But the highest priority load was allowed to operate at its highest energy consumption longer than the other two, lower-priority loads.

While the invention has been described in detail with reference to preferred embodiments thereof, the described embodiments have been presented by way of example and not by way of limitation. It will be understood by those skilled in the art and having reference to this specification that various changes may be made in the form and details of the described embodiments without deviating from the spirit and scope of the invention as defined by the appended claims.

What is claimed is:

1. A method comprising:
configuring at least first and second setting for each respective device of a plurality of devices such that the respective device consumes current, a volt-ampere product, or power up to a first cap when running at the respective device's first setting and up to a second cap when running at the respective device's second setting wherein the first cap is higher than the second cap;
supplying electric energy to the devices from a common source and running each of the devices at their respective first setting, the devices drawing current through a circuit breaker;
sensing a parameter that is proportional to an aggregate amount of electric energy consumed by the devices from the common source, wherein the parameter is an electric current flowing through a circuit branch that supplies the devices, the circuit breaker connected in the circuit branch;
storing a table that associates an identifier of the circuit branch with each of the devices in the circuit branch, the table indicating which setting of the first and second setting each respective device of the devices is currently operating at;
determining that the parameter has reached or exceeded a threshold that corresponds to a trip level of the circuit breaker; and
responsive to the determining, selecting, based on the table, a device of the devices currently running at its first setting, and sending a command to the selected device to cause the selected device to operate at its second setting.

2. The method of claim 1, wherein the tables stores respective priorities of the devices, the method further comprising determining, based on the table, a priority order among the devices, wherein the selecting comprises selecting a lowest priority device of the devices currently running at their respective first settings.

3. The method of claim 1, wherein the parameter is a temperature inside an enclosure that houses all of the devices.

4. The method of claim 1, wherein the parameter is a value determined at least in part responsive to a current and a voltage measured on a circuit branch that supplies all of the devices, the circuit breaker connected in the circuit branch.

5. The method of claim 1, wherein configuring the first and second settings comprises:
configuring the first settings such that responsive to all of the devices consuming electric energy at their first caps simultaneously, the parameter would exceed the threshold; and
configuring the second settings such that responsive to all of the devices consuming electric energy at their first caps simultaneously, the parameter would not exceed the threshold.

6. The method of claim 1, wherein the first caps for the devices share a common value, and the second caps for the devices share a common value.

7. The method of claim 1, wherein a first entry of the table stores the identifier of the circuit branch, a value specifying which of the first and second settings a first device of the devices is operating at, and a priority value specifying a priority of the first device, and
wherein a second entry of the table stores the identifier of the circuit branch, a value specifying which of the first and second settings a second device of the devices is operating at, and a priority value specifying a priority of the second device.

8. An electric energy distribution system, comprising:
a plurality of loads configured to receive electric energy from a common feed, each respective load of the loads configured to operate in at least first and second modes such that the respective load consumes current, a volt-ampere product, or power up to a first cap when running in the respective load's first mode and up to a second cap when running in the respective load's second mode, wherein the first cap is higher than the second cap;
a sensor configured to monitor a current flowing through a circuit branch that supplies the loads from the common feed, the loads drawing current through a circuit breaker in the circuit branch; and
a manager coupled to the sensor and configured to:
compare the current to a threshold that corresponds to a trip level of the circuit breaker, in response to the current meeting or exceeding the threshold, select, using a table, a load of the loads currently running in its first mode, the table associating an identifier of the circuit branch with each of the loads in the circuit branch, and the table indicating which mode of the first and second modes each respective load of the loads is currently operating at, and send a command to the selected load to cause the selected load to run in its second mode.

9. The system of claim 8, wherein the tables stores information specifying respective priorities of the loads, and wherein the selecting of the load is based on the information specifying the respective priorities.

10. The system of claim 8, wherein the first and second modes are defined such that, responsive to all of the loads consuming electric energy at their respective first caps simultaneously, the current would exceed the threshold, and responsive to all of the loads consuming electric energy at their respective second caps simultaneously, the current parameter would not exceed the threshold.

11. The system of claim 8 wherein each of the loads is a server computing device, the system further comprising a rack housing the loads, wherein the sensor and manager are housed within a power distribution unit mounted inside the rack.

12. The system of claim 8, wherein a first entry of the table stores the identifier of the circuit branch, a value specifying which of the first and second settings a first load of the loads is operating at, and a priority value specifying a priority of the first load, and wherein a second entry of the table stores the identifier of the circuit branch, a value specifying which of the first and second settings a second load of the loads is operating at, and a priority value specifying a priority of the second load.

13. An apparatus comprising:

a sensor to monitor a parameter that corresponds to an aggregate amount of current drawn by plural devices in a circuit branch from a common source, wherein each respective device of the plural devices is configured to operate in at least a first mode and a second mode such that the respective device consumes current, a volt-ampere product, or power up to a first cap when running in the respective device's first mode and up to a second cap when running in the respective device's second mode, wherein the first cap is higher than the second cap, wherein the plural devices draw current through a circuit breaker in the circuit branch; and a manager coupled to the sensor to:

compare the parameter to a threshold that corresponds to a trip level of the circuit breaker, select, based on a table, a device of the devices currently running in its first mode, the table associating an identifier of the circuit branch with each of the devices in the circuit branch, the table indicating which setting of the first and second modes each respective device of the devices is currently operating at, and the table further associating identifiers of other circuit branches with other devices and send a command to the selected device to cause the selected device to run in its second mode in which the selected device draws current from the common source.

14. The apparatus of claim 13, wherein the table stores information specifying respective priorities of the devices, and responsive to the parameter meeting or exceeding the threshold, the manager is to select, based on the information specifying the respective priorities, a lowest priority device of the devices currently running in their respective first modes.

15. The apparatus of claim 13, wherein a first entry of the table stores the identifier of the circuit branch, a value specifying which of the first and second settings a first device of the devices is operating at, and a priority value specifying a priority of the first device, and wherein a second entry of the table stores the identifier of the circuit branch, a value specifying which of the first and second settings a second device of the devices is operating at, and a priority value specifying a priority of the second device.

* * * * *